United States Patent
Le (10) Patent No.: US 6,209,404 B1
(45) Date of Patent: Apr. 3, 2001

(54) INTERMITTENT GENEVA ACTUATED MECHANISM

(75) Inventor: Vu Han Le, Ypsilanti, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/426,215

(22) Filed: Oct. 25, 1999

(51) Int. Cl.[7] ................................................. B60H 1/00
(52) U.S. Cl. ............................ 74/89.18; 74/435; 74/436; 454/69
(58) Field of Search ..................... 74/436, 435, 89.18; 454/69, 155

(56) References Cited

U.S. PATENT DOCUMENTS

| | | |
|---|---|---|
| 4,312,381 | 1/1982 | Ratner . |
| 5,281,049 | 1/1994 | Holt . |
| 6,129,627 * | 10/2000 | Jankowski et al. .................. 454/155 |

* cited by examiner

Primary Examiner—Rodney H. Bonck
(74) Attorney, Agent, or Firm—Tarolli, Sundheim, Covell, Tummino & Szabo. L.L.P.

(57) ABSTRACT

An apparatus (10) includes a manually rotatable input member (15), an input gear (20), an output gear (40), a drive link (60), a first planar link (80), and a second planar link (90). The input gear (20) is operatively connected to the input member (15) to rotate with the input member (15). The input gear (20) includes a smooth portion (26, 28) and a toothed portion (22, 24). The output gear (40) has teeth (42, 43) which are operatively engageable with the toothed portion (22, 24) of the input gear (20) such that the toothed portion (22, 24) of the input gear (20) imparts rotation to the output gear (40). The smooth portion (22, 24) of the input gear (20) allows rotation of the input member (15) without imparting rotation to the output gear (40). The drive link (60) is connected to the output gear (40) such that rotation of the output gear (40) imparts rotation to the drive link (60). The drive link (60) has an engagement pin (62) which is rotatable with the drive link (60). The first planar link (80) and second planar link (90) each have a slot for receiving the engagement pin (62). The planar links are rotatable by the engagement pin (62) when the engagement pin rotates in the slots.

17 Claims, 7 Drawing Sheets

INTERMITTENT GENEVA ACTUATED MECHANISM

FIELD OF THE INVENTION

This invention relates to an air handling apparatus, and more particularly to an apparatus for controlling the distribution of air flowing into the occupant compartment of a vehicle.

DESCRIPTION OF THE PRIOR ART

Vehicles, such as passenger cars and trucks, are equipped with climate control means for directing air into the occupant compartment. The climate control means includes ducts. These ducts include an air inlet to a plenum and outlets from the plenum for directing the air into the occupant compartment. The outlets may include a dashboard panel duct, a floor duct, and a defrost duct. Heating and/or air conditioning means may be incorporated in the climate control means.

The ducts are associated with a plurality of doors for selectively directing the air from the plenum to one or more of the outlets. These doors, upon being moved to appropriate open, closed, or intermediate positions, may provide for air to flow out of the plenum to the dashboard panel duct in an amount greater than to the floor duct with no flow to the defrost duct, equally to the dashboard panel and floor ducts with no flow to the defrost duct, to the floor duct in an amount greater than to the defrost duct with no flow to the dashboard panel duct, equally to the defrost and floor ducts with no flow to the dashboard panel duct, or to the defrost duct only.

The area behind the vehicle dashboard panel is usually very limited, and, therefore, it is desired that climate control means be as simple and compact as possible. Electric and vacuum controls are frequently used, but must utilize remote drive means which are expensive and difficult to maintain.

An occupant selects the position of the doors by either rotating a selector knob or moving a mechanical slide. There seldom is a directly proportional relationship between the position of any plenum door and the position of the selector knob or slide. This also complicates the apparatus. The electric controls require a specialized circuit to determine the position of the doors. The vacuum controls require a vacuum circuit, solenoid valves, and a vacuum reservoir.

A simple, durable, and compact apparatus, such as the completely mechanical and proportional structure of the present invention, will eliminate the above described deficiencies present in the prior art and allow retrofitting into already existing systems as well.

SUMMARY OF THE INVENTION

In accordance with the present invention, an apparatus comprises a manually rotatable input member, an input gear, an output gear, a drive link, a first planar link, and a second planar link. The input gear is operatively connected to the input member to rotate with the input member. The input gear includes a smooth portion and a toothed portion. The output gear has teeth which are operatively engageable with the toothed portion of the input gear such that the toothed portion of the input gear imparts rotation to the output gear. The smooth portion of the input gear allows rotation of the input member without imparting rotation to the output gear. The drive link is connected to the output gear such that rotation of the output gear imparts rotation to the drive link. The drive link has an engagement pin which is rotatable with the drive link. The first planar link has a first slot for receiving the engagement pin. The first planar link is rotatable by the engagement pin when the engagement pin rotates in the first slot. The second planar link has a second slot for receiving the engagement pin. The second planar link is rotatable by the engagement pin when the engagement pin rotates in the second slot.

Typically this apparatus controls doors that control air flow into the passenger compartment of a vehicle.

BRIEF DESCRIPTION OF THE DRAWINGS

The foregoing and other features of the present invention will become apparent to those skilled in the art to which the present invention relates upon reading the following description with reference to the accompanying drawings, wherein.

DESCRIPTION OF PREFERRED EMBODIMENT

Figure 1:
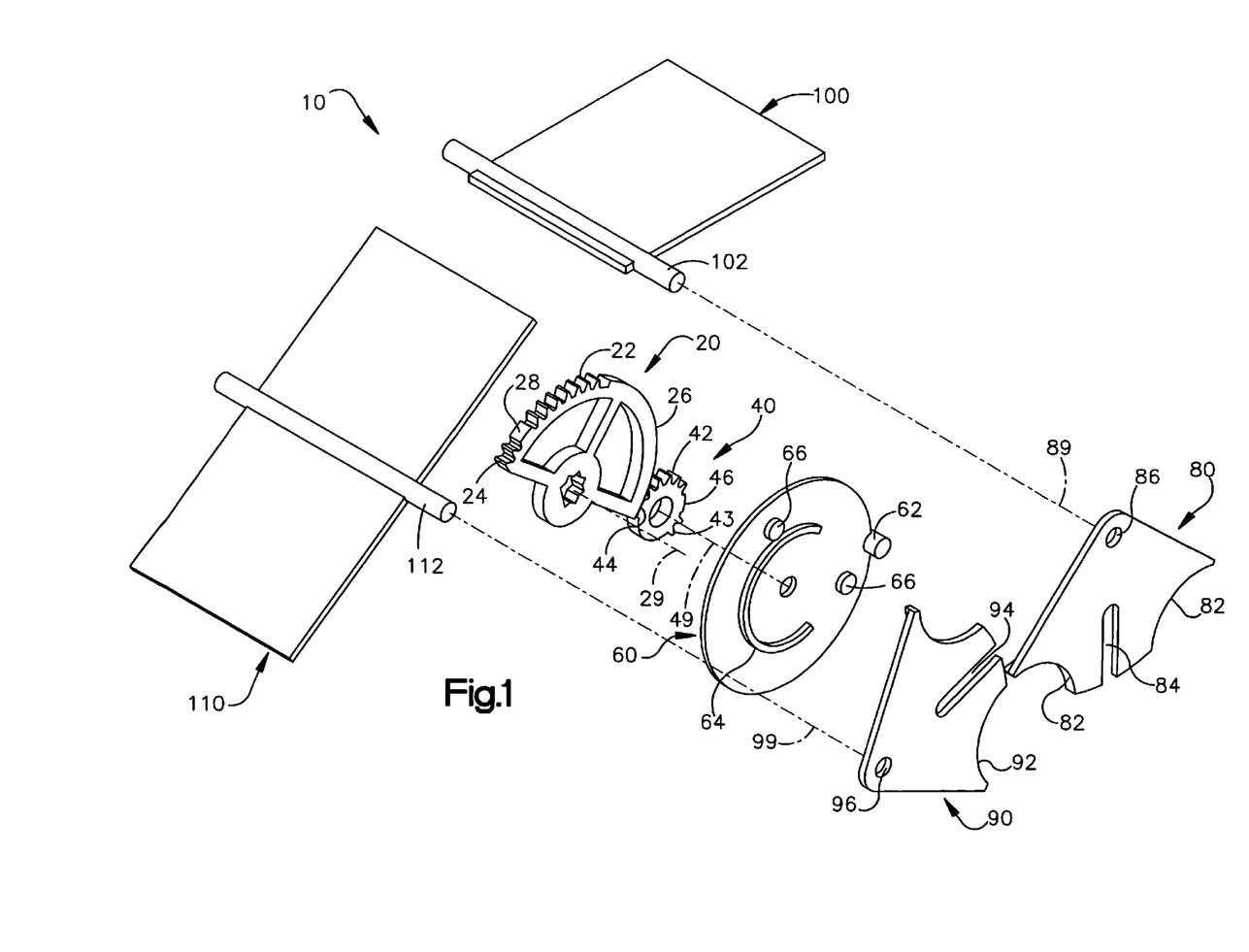
FIG. 1 is an exploded isometric view of parts of an apparatus embodying the present invention.

As representative of an embodiment of the present invention, as illustrated in FIG. 1, an apparatus 10 includes an input gear 20, an output gear 40, a drive link 60, a first planar link 80, a second planar link 90, a first plenum door 100, and a second plenum door 110.

The input gear 20 has a semicircular perimeter, toothed portions 22, 24 and smooth portions 26, 28. The toothed portions 22, 24 engage teeth 42, 43 on the output gear 40 thereby imparting rotation to the output gear 40. The smooth portions 26, 28 of the input gear 20 allow rotation of the input gear 20 without imparting rotation to the output gear 40. The smooth portions 26, 28 may slide along corresponding smooth portions 44, 46 on the output gear 40, thus overcoming any friction. Alternatively, the smooth portions 26, 28, 44, 46 of the input 20 and output 40 gears may form a gap and never come into contact with each other.

The smooth portions 26, 28 of the input gear 20 include a first smooth portion 26 and a second smooth portion 28 circumferentially spaced apart from the first smooth portion 26 on the perimeter of the input gear 20. Rotation of the input gear 20 in a first direction 21 (FIG. 2) about the axis 29 of the input gear 20 allows the toothed portions 22, 24 of the input gear 20 to engage the teeth 42, 43 of the output gear 40 and impart rotation to the output gear 40 in an opposite second direction 41 (FIG. 2) about the axis 49 of the output gear 40.

The output gear 40 has teeth 42, 43 which are operatively engageable with the toothed portions 22, 24 of the input gear 20 such that the toothed portions 22, 24 of the input gear 20 impart rotation to the output gear 40. The smooth portions 44, 46 of the output gear 40 include a first smooth portion 44 and a second smooth portion 46 circumferentially spaced apart from the first smooth portion 44 on the perimeter of the output gear 40.

The drive link 60, a Geneva-type circular disk, is connected to the output gear 40 such that rotation of the output gear 40 imparts rotation directly to the drive link 60. The drive link 60 has an engagement pin 62 which is located on the perimeter of the drive link 60 and is thus rotatable with the drive link 60. The drive link 60 has a lock ring 64 for engaging a first arcuate surface 82 on the first planar link 80 and a second arcuate surface 92 on the second planar link 90. Two lock pins 66 on the drive link 60 restrict movement of the first 80 and second 90 planar links away from the drive link 60 as the first 82 and second 92 arcuate surfaces slide between the lock ring 64 and either of the lock pins 66.

The first planar link 80 has a linear and open-ended first slot 84 for receiving the engagement pin 62. The first planar link 80 is rotatable about the axis 89 by the engagement pin 62 when the engagement pin 62 rotates in the first slot 84 and travels in an arcuate path at the perimeter of the drive link 60.

The second planar link 90 has a linear and open-ended second slot 94 for receiving the engagement pin 62. The second planar link 90 is rotatable about the axis 99 by the engagement pin 62 when the engagement pin 62 rotates in the second slot 94 and travels in an arcuate path at the perimeter of the drive link 60.

Figure 2:
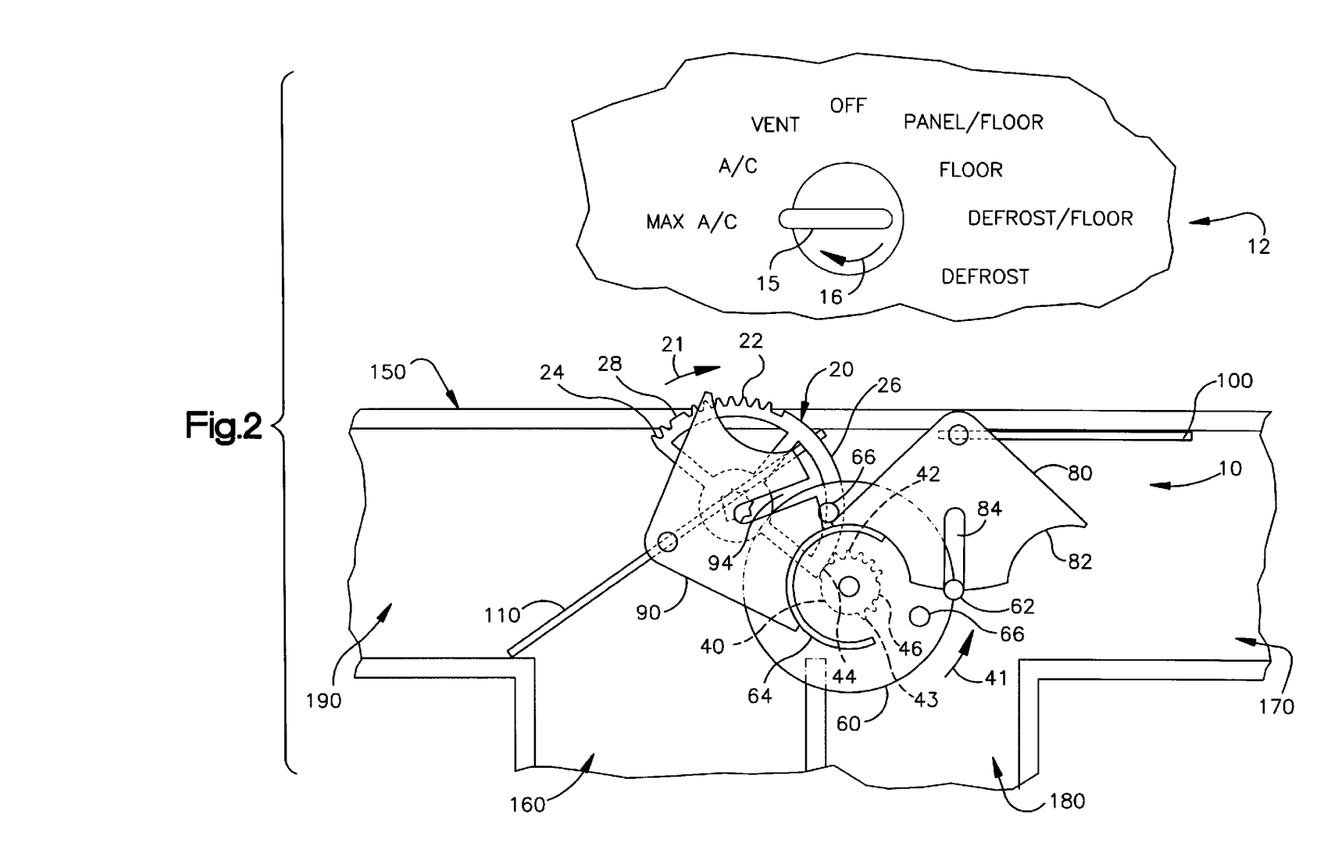
FIG. 2 is a schematic view of parts of the apparatus of FIG. 1 illustrating the apparatus in one position.

The first 100 and second 110 plenum doors control air flow within a plenum chamber 150 (FIG. 2). The first plenum door 100 has a first shaft 102 which is connected for rotation with the first planar link 80 at a first opening 86 on the first planar link 80. The second plenum door 110 has a second shaft 112 which is connected for rotation with the second planar link 90 at a second opening 96 on the second planar link 90.

The axes of rotation of the input gear 29, the output gear 49, the drive link 49, the first planar link 89, the second planar link 99, the first plenum door 89, and the second plenum door 99 are parallel, as shown in FIG. 1. The output gear 40 and the drive link 60 rotate about a common axis 49.

The plenum chamber 150 (FIG. 2) includes a plenum inlet 160, a panel duct outlet 170, a floor duct outlet 180, and a defrost duct outlet 190.

As shown in FIGS. 2–7, a manually rotatable input member 15, or knob, rotates with the input gear 20 in a directly proportional positional relationship. The input member 15 would typically be located on a vehicle dashboard for rotational movement by an operator. The apparatus 10 is shown in FIGS. 2–7 as it would be viewed from the side of the plenum chamber 150.

In FIG. 2, the input member 15 on the control panel 12 and the input gear 20 are in MAX A/C mode. This mode allows a predetermined portion of the inlet air, typically 90%, to travel to the panel duct 170. The remaining air, typically 10%, travels to the floor duct 180. The first plenum door 100 is fully open and the second plenum door 110 completely seals off the defrost duct 190 from the plenum inlet 160.

Figure 3:
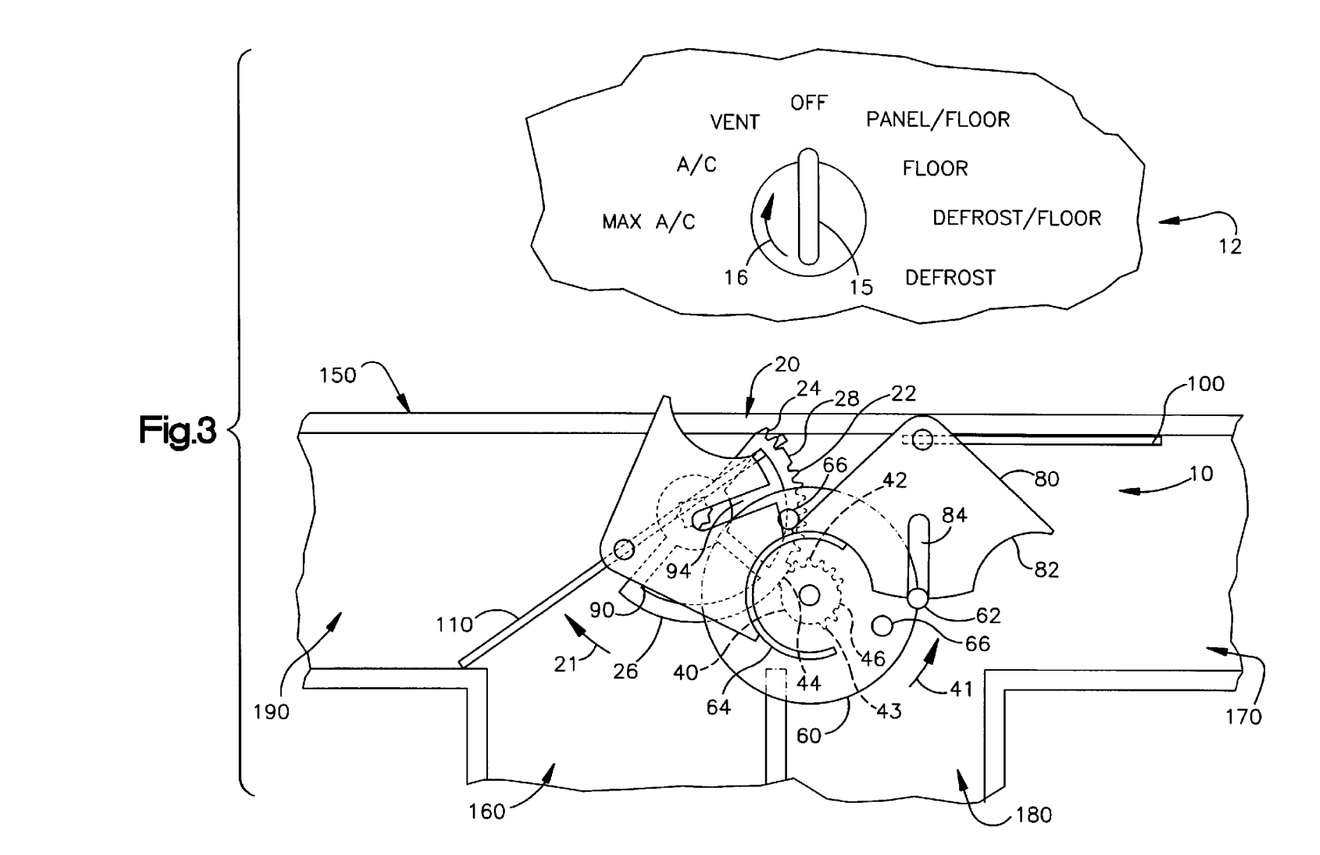
FIG. 3 is a schematic view of parts of the apparatus of FIG. 1 illustrating the apparatus in another position.

In FIG. 3, the input member 15 and the input gear 20 have both been rotated three predetermined increments, typically 30 degrees, in the direction of the arrows 16, 21 from MAX A/C to A/C to VENT to OFF. The control scheme upon which this embodiment has been based determines that the first 100 and second 110 plenum doors be in the identical positions as in FIG. 1 in all of the these modes. The lack of engagement between the input gear 20 and the output gear 40, determined by the first smooth portion 26 on the input gear 20 and the first smooth portion 44 on the output gear 40, has allowed this intermittent engagement condition to be met.

Figure 4:
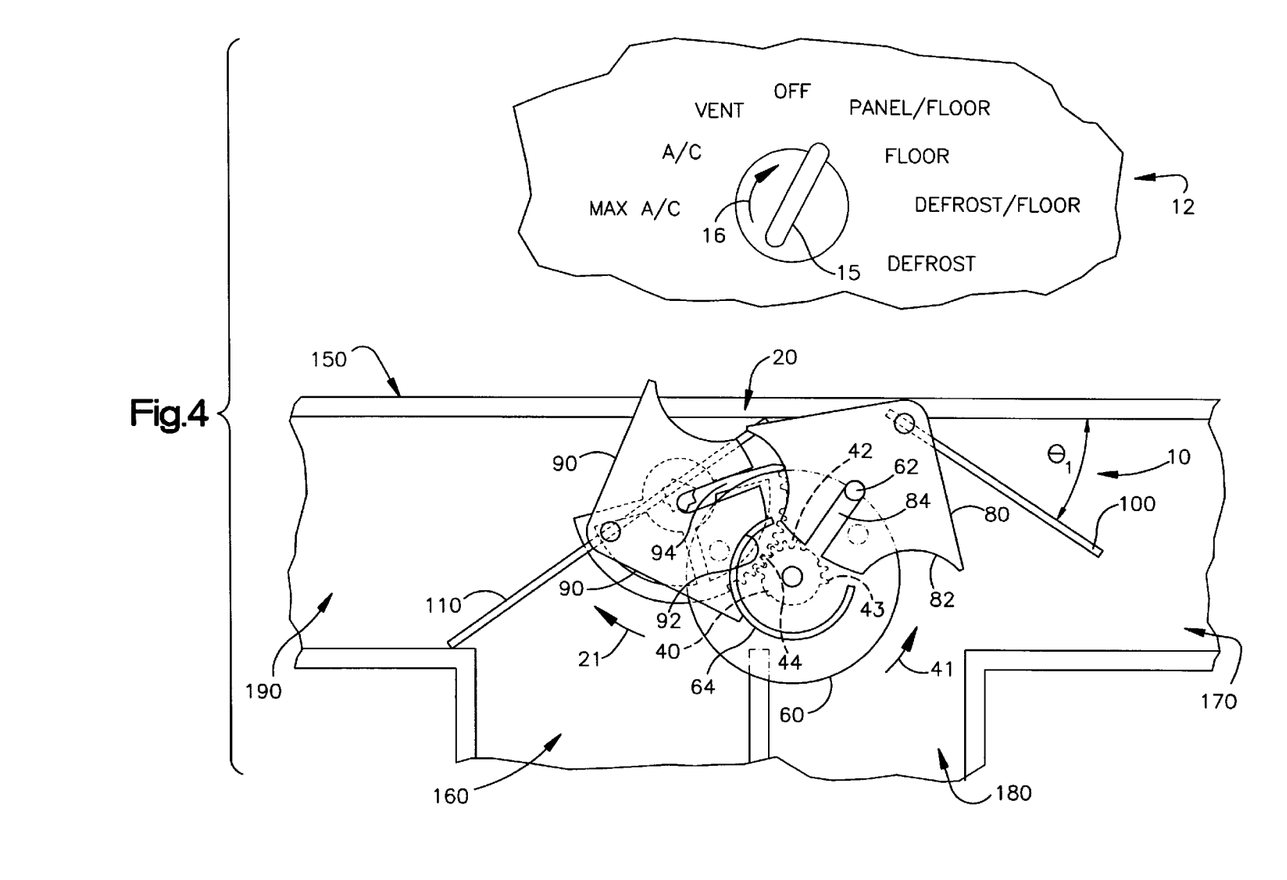
FIG. 4 is a schematic view of parts of the apparatus of FIG. 1 illustrating the apparatus in still another position.

In FIG. 4, the input member 15 and the input gear 20 have both been rotated one of the above stated increments in the direction of the arrows 16, 21 to the PANEL/FLOOR mode. The engagement of the input gear 20 and the output gear 40, determined by the toothed portion 22 of the input gear 20 and the teeth 42 of the output gear 40, has imparted rotation to the output gear 40. Both the output gear 40 and the driver link 60 have rotated in the direction of the arrow 41 a predetermined amount (depending on the particular gear ratios).

The engagement pin 62 of the driver link 60 correspondingly has traveled along the perimeter of the driver link 60 and has engaged (linearly and rotationally) the first slot 84 of the first planar link 80 through its open end. The arcuate path of the engagement pin 62 thus caused the first planar link 80, and the first plenum door 100, to rotate about their axis 89 a predetermined amount ($\Theta_1$). The lock ring 64 of the driver link 60 has slid along the second arcuate surface 92 of the second planar link 90, but imparted no motion to the second planar link 90.

This rotation of the first plenum door 100 has created an equal air flow to the panel duct 170 and the floor duct 180 while the second plenum door 110 still seals off the defrost duct 190 from the plenum inlet 160.

Figure 5:
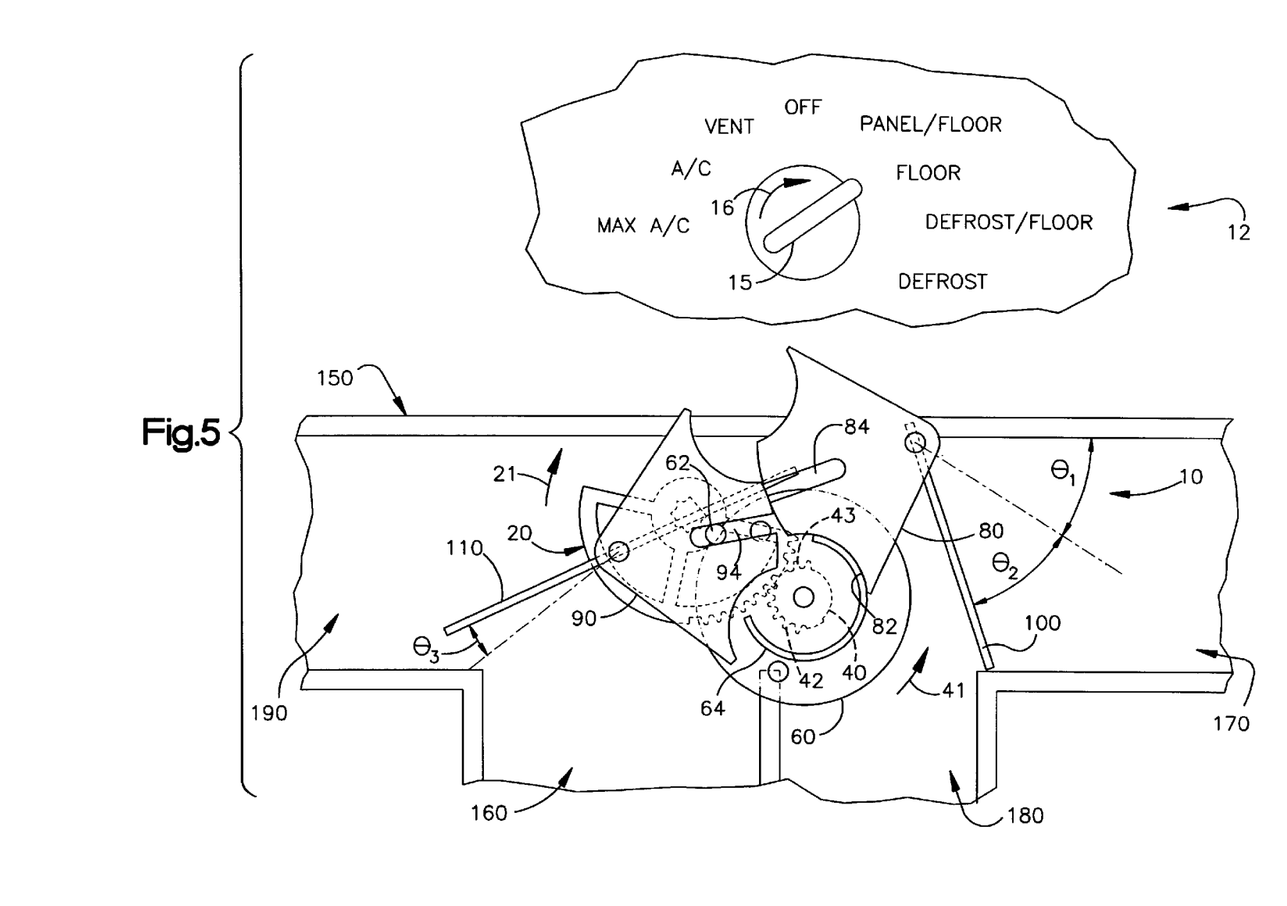
FIG. 5 is a schematic view of parts of the apparatus of FIG. 1 illustrating the apparatus in yet another position.

In FIG. 5, the input member 15 and the input gear 20 have both been rotated one of the above stated increments in the direction of the arrows 16, 21 to the FLOOR mode. The engagement of the input gear 20 and the output gear 40, determined by the toothed portion 22 of the input gear 20 and the teeth 42 of the output gear 40, has imparted rotation to the output gear 40.

The engagement pin 62 of the driver link 60 correspondingly has traveled along the perimeter of the driver link 60 and has disengaged the first slot 84 of the first planar link 80 through its open end. The arcuate path of the engagement pin 62 has caused the first planar link 80, and the first plenum door 100, to rotate about their axis 89 a predetermined amount ($\Theta_2$).

Typically, the apparatus 10 is designed to allow $\Theta_1$ of FIG. 4 to not be equal to $\Theta_2$. If experimental data shows that a proper airflow balance can be achieved with $\Theta_1$ equal to $\Theta_2$, the apparatus 10 has the flexibility to allow it. Likewise, the apparatus 10 has the flexibility to allow $\Theta_1$ not equal to $\Theta_2$.

After the pin 62 continued in its arcuate path and disengaged the first slot 84 of the first planar link 80, the engagement pin 62 then engaged (linearly and rotationally) the second slot 94 of the second planar link 90 through its open end. This engagement caused the second planar link 90, and the second plenum door 110, to rotate about their axis 99 a predetermined amount ($\Theta_3$). The lock ring 64 of the driver link 60 has slid along the first arcuate surface 82 of the first planar link 80 and imparted no motion to the first planar link 80.

The rotation of the first plenum door 100 and the second plenum door 110 has caused a large portion of the inlet air, typically 90%, to flow to the floor duct 180 and a small portion of the inlet air, typically 10%, to flow to the defrost duct 190 while the first plenum door 100 seals off the panel duct 170 from the plenum inlet 160. (The 10% DEFROST bleed helps keep a vehicle windshield from fogging in this mode.)

Figure 6:
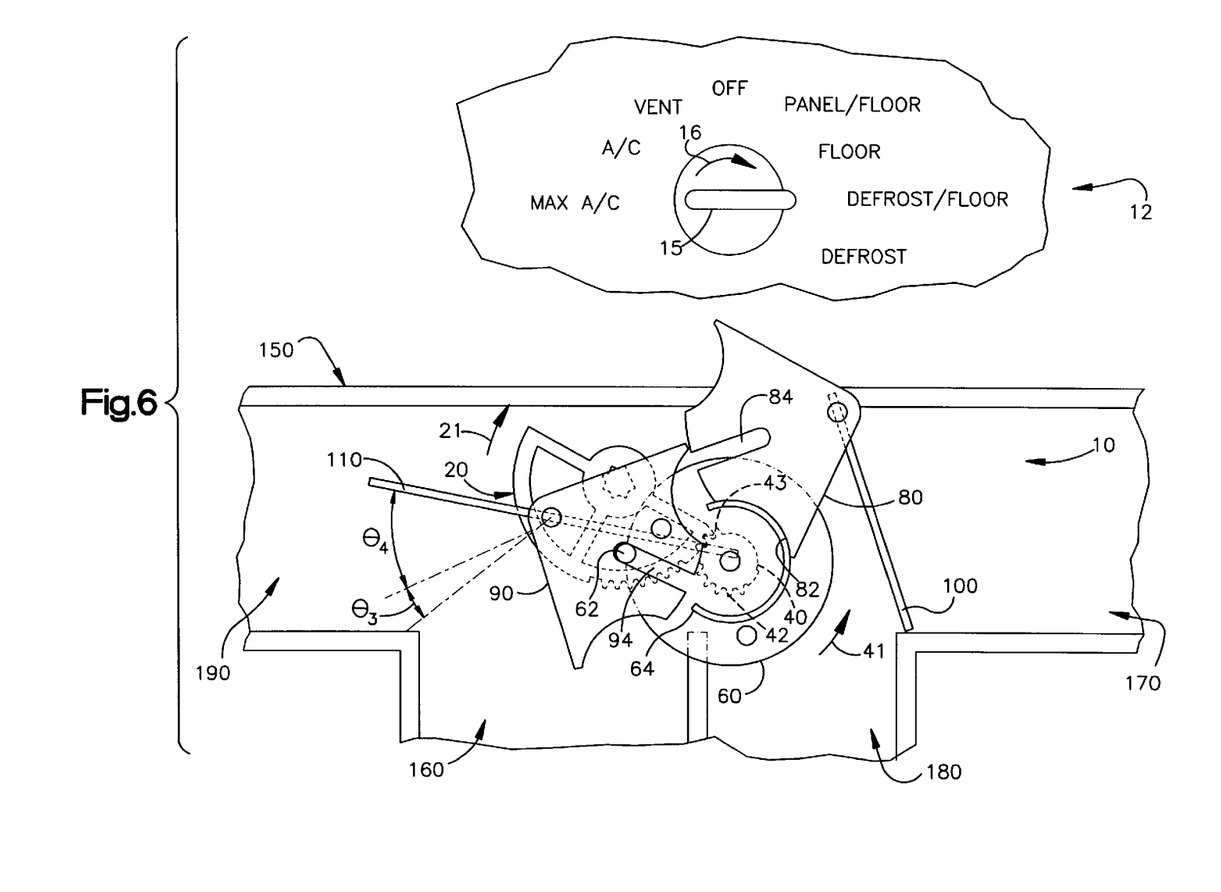
FIG. 6 is a schematic view of parts of the apparatus of FIG. 1 illustrating the apparatus in still another position.

In FIG. 6, the input member 15 and the input gear 20 have both been rotated one of the above stated increments in the direction of the arrows 16, 21 to the DEFROST/FLOOR mode. The engagement of the input gear 20 and the output gear 40, determined by the toothed portion 24 of the input gear 20 and the teeth 43 of the output gear 40, has imparted rotation to the output gear 40. Both the output gear 40 and the driver link 60 have rotated in the direction of the arrow 41 a predetermined amount (depending on the particular gear ratios).

The engagement pin 62 of the driver link 60 correspondingly has traveled along the perimeter of the driver link 60 and engaged (linearly and rotationally) the second slot 94 of the second planar link 90. The arcuate path of the engagement pin 62 thus caused the second planar link 90, and the second plenum door 110, to rotate about their axis 99 a predetermined amount ($\Theta_4$).

The lock ring 64 of the driver link 60 has slid along the first arcuate surface 82 of the first planar link 80 and imparted no motion to the first planar link 80. This rotation of the second plenum door 110 has created an equal air flow to the floor duct 180 and the defrost duct 190 while the first plenum door 100 still seals off the panel duct 170 from the plenum inlet 160.

Additionally, during a part of this rotation of the input gear 20, the second smooth portion 28 of the input gear 20 and the second smooth portion 46 of the output gear 40 have come into alignment. As before, this has allowed the input gear 20 to rotate some amount while the output gear 40 has not rotated. This caused the output gear 40 to rotate less than it would have without this alignment of the smooth portions 28, 46. Both the output gear 40 and the driver link 60 have rotated in the direction of the arrow 41 a predetermined amount (depending on the particular gear ratios).

Figure 7:
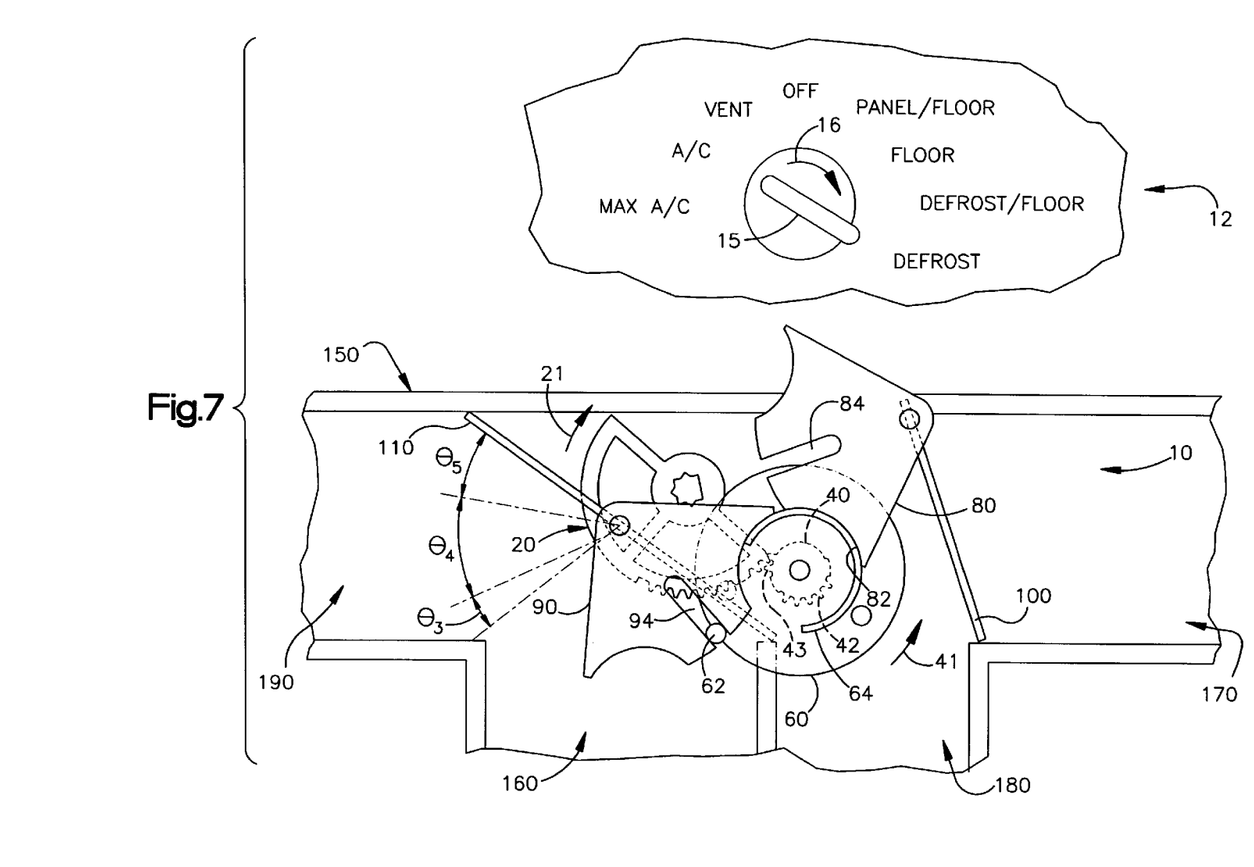
FIG. 7 is a schematic view of parts of the apparatus of FIG. 1 illustrating the apparatus in yet another position.

In FIG. 7, the input member 15 and the input gear 20 have both been rotated one of the above stated increments in the direction of the arrows 16, 21 to the DEFROST mode. The engagement of the input gear 20 and the output gear 40, determined by the toothed portion 24 of the input gear 20 and the teeth 43 of the output gear 40, has imparted rotation to the output gear 40. Both the output gear 40 and the driver link 60 have rotated in the direction of the arrow 41 a predetermined amount (depending on the particular gear ratios).

The engagement pin 62 of the driver link 60 correspondingly has traveled along the perimeter of the driver link 60 and engaged (linearly and rotationally) the second slot 94 of the second planar link 90. The arcuate path of the engagement pin 62 thus caused the second planar link 90, and the second plenum door 110, to rotate about their axis 99 a predetermined amount ($\Theta_5$).

The lock ring 64 of the driver link 60 has slid along the first arcuate surface 82 of the first planar link 80 and imparted no motion to the first planar link 80. This rotation of the second plenum door 110 has sealed off the panel 170 and floor 180 ducts and created a 100% air flow to the defrost duct 190 from the plenum inlet 160.

As seen in FIGS. 5, 6, and 7, $\Theta_3 \neq \Theta_4 \neq \Theta_5$. Any of these angles may be equivalent, however, as determined by specific design criteria and experimental data.

As is illustrated from the above discussion of the modes of operation, the gear ratios of the input and output gears, magnitude of the smooth portions, location of the axes of rotation, and dimensions of the components determines the actual operation of an apparatus constructed in accordance with this embodiment of the present invention.

From the above description of one possible embodiment of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a manually rotatable input member;
   an input gear operatively connected to said input member to rotate with said input member, said input gear including a smooth portion and a toothed portion;
   an output gear having teeth operatively engageable with said toothed portion of said input gear such that said toothed portion of said input gear imparts rotation to said output gear;
   a drive link connected to said output gear such that rotation of said output gear imparts rotation to said drive link, said drive link having an engagement pin rotatable with said drive link;
   a first planar link having a first slot for receiving said engagement pin, said first planar link being rotatable by said engagement pin when said engagement pin rotates in said first slot; and
   a second planar link having a second slot for receiving said engagement pin, said second planar link being rotatable by said engagement pin when said engagement pin rotates in said second slot,
   said smooth portion of said input gear allowing rotation of said input member without imparting rotation to said output gear.

2. The apparatus as defined in claim 1 wherein said input gear includes a first smooth portion and a second smooth portion circumferentially spaced apart from said first smooth portion.

3. The apparatus as defined in claim 1 wherein said drive link includes a lock ring for engaging a first arcuate surface on said first planar link.

4. The apparatus as defined in claim 3 wherein said lock ring engages a second arcuate surface on said second planar link.

5. The apparatus as defined in claim 1 further including a first plenum door for controlling air flow, said first plenum door being connected for rotation with said first planar link.

6. The apparatus as defined in claim 5 further including a second plenum door for controlling air flow, said second plenum door being connected for rotation with said second planar link.

7. The apparatus as defined in claim 1 wherein said drive link includes a circular disk, said engagement pin being located on the perimeter of said circular disk.

8. The apparatus as defined in claim 1 wherein said output gear includes a smooth portion for engaging said smooth portion of said input gear.

9. The apparatus as defined in claim 1 further including a plenum chamber, said plenum chamber including a plenum inlet, a defrost duct outlet, a panel duct outlet, and a floor duct outlet.

10. The apparatus as defined in claim 1 wherein rotation of said input gear in a first direction about the axis of said input gear imparts rotation to said output gear in an opposite second direction about the axis of said output gear.

11. An apparatus comprising:
   an input knob for rotational movement by an operator;
   an input gear connected to said input knob for rotation with said input knob;
   an output gear operatively engageable with said input gear such that said input gear imparts no rotation to said output gear through a part of the rotation of said input gear and said input gear imparts rotation to said output gear through another part of the rotation of said input gear;

a drive link connected to said output gear such that rotation of said output gear imparts rotation to said drive link, said drive link having an engagement pin;

a first planar link having a first slot for receiving said engagement pin; and a second planar link having a second slot for receiving said engagement pin.

12. The apparatus as defined in claim 11 wherein said input gear includes a smooth portion for sliding engagement with said output gear and a toothed portion for imparting rotation to said output gear.

13. The apparatus as defined in claim 11 wherein said first and second slots are each linear.

14. The apparatus as defined in claim 11 wherein said input gear has a perimeter in the shape of a semicircle.

15. The apparatus as defined in claim 11 wherein the axes of rotation of said input knob, said input gear, said output gear, said drive link, said first planar link, and said second planar link are parallel.

16. The apparatus as defined in claim 15 wherein said output gear and said drive link rotate about a common axis.

17. The apparatus as defined in claim 11 wherein said drive link includes two lock pins for restricting movement of said first and second planar links away from said drive link.

* * * * *